US011881131B2

(12) United States Patent
Lee et al.

(10) Patent No.: US 11,881,131 B2
(45) Date of Patent: Jan. 23, 2024

(54) DISPLAY DEVICE WITH CRACK DETECTION CIRCUITRY AND MANUFACTURING METHOD THEREOF

(71) Applicant: Samsung Display Co., LTD., Yongin-si (KR)

(72) Inventors: Kwang Sae Lee, Asan-si (KR); Ji-Hyun Ka, Seongnam-si (KR); Won Kyu Kwak, Seongnam-si (KR); Hwa Young Song, Asan-si (KR); Ki Myeong Eom, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/972,918

(22) PCT Filed: Jun. 4, 2019

(86) PCT No.: PCT/KR2019/006750
§ 371 (c)(1),
(2) Date: Dec. 7, 2020

(87) PCT Pub. No.: WO2019/235823
PCT Pub. Date: Dec. 12, 2019

(65) Prior Publication Data

US 2021/0248938 A1 Aug. 12, 2021

(30) Foreign Application Priority Data

Jun. 7, 2018 (KR) ........................ 10-2018-0065523

(51) Int. Cl.
*G09G 3/00* (2006.01)
*G09G 3/20* (2006.01)

(52) U.S. Cl.
CPC ............... *G09G 3/006* (2013.01); *G09G 3/20* (2013.01); *G09G 2310/0275* (2013.01); *G09G 2330/12* (2013.01)

(58) Field of Classification Search
CPC ........ G09G 3/006; G09G 3/20; G09G 3/2092; G09G 3/30; G09G 3/3225; G09G 3/3275;
(Continued)

(56) References Cited

U.S. PATENT DOCUMENTS

2009/0057925 A1* 3/2009 Sasaki .................. H01L 23/585 257/784
2012/0161805 A1* 6/2012 Jung ...................... G09G 3/006 324/754.07

(Continued)

FOREIGN PATENT DOCUMENTS

EP 3 330 951 6/2018
KR 1998-0015037 5/1998

(Continued)

*Primary Examiner* — Keith L Crawley
(74) *Attorney, Agent, or Firm* — KILE PARK REED & HOUTTEMAN PLLC

(57) ABSTRACT

A display device includes a substrate including a display area and a non-display area disposed near the display area, a plurality of pixels disposed in the display area, a plurality of signal lines disposed on the substrate and connected to the pixels, and a pad portion disposed in the non-display area and including a plurality of pads. The signal lines include a first crack detecting line connected to a first test voltage pad and a first pad at a first node, connected to a second pad at a second node, and extending around the non-display area between the first node and the second node, as well as a first data line including a first end connected to a first transistor connected to the first crack detecting line at the second node, and a second end connected to corresponding pixels from among the plurality of pixels.

17 Claims, 9 Drawing Sheets

(58) Field of Classification Search
CPC ...... G09G 3/36; G09G 3/3611; G09G 3/3648; G09G 3/3685; G09G 3/3688; G09G 2300/0426; G09G 2300/043; G09G 2310/0264; G09G 2310/0275; G09G 2330/12; G09G 2330/04; G09G 2380/02; G01L 1/20; G01L 1/22; G01L 1/225
See application file for complete search history.

(56) References Cited

U.S. PATENT DOCUMENTS

| | | | | |
|---|---|---|---|---|
| 2013/0083457 | A1* | 4/2013 | Wurzel | G02F 1/1309 361/679.01 |
| 2014/0176844 | A1* | 6/2014 | Yanagisawa | G09G 3/006 349/43 |
| 2016/0260367 | A1* | 9/2016 | Kwak | G09G 3/006 |
| 2017/0237009 | A1 | 8/2017 | Kwak et al. | |
| 2017/0285376 | A1 | 10/2017 | Okamae et al. | |
| 2018/0033354 | A1* | 2/2018 | Lee | G09G 3/006 |
| 2018/0053466 | A1 | 2/2018 | Zhang et al. | |
| 2018/0158741 | A1* | 6/2018 | Kim | G09G 3/006 |
| 2018/0174505 | A1* | 6/2018 | Mandlik | G09G 3/035 |
| 2018/0336808 | A1 | 11/2018 | Lee et al. | |
| 2020/0135595 | A1 | 4/2020 | Kim et al. | |
| 2021/0343606 | A1 | 11/2021 | Kim et al. | |

FOREIGN PATENT DOCUMENTS

| | | |
|---|---|---|
| KR | 10-2009-0090493 | 8/2009 |
| KR | 10-2014-0011656 | 1/2014 |
| KR | 10-2015-0005375 | 1/2015 |
| KR | 10-2016-0017845 | 2/2016 |
| KR | 10-2016-0139122 | 12/2016 |
| KR | 10-1783953 | 10/2017 |
| KR | 10-2018-0014906 | 2/2018 |

* cited by examiner

DISPLAY DEVICE WITH CRACK DETECTION CIRCUITRY AND MANUFACTURING METHOD THEREOF

CROSS REFERENCE TO RELATED APPLICATION(S)

This application is a national entry of International Application No. PCT/KR2019/006750, filed on Jun. 4, 2019, which claims under 35 U.S.C. § 119(a) and 365(b) priority to and benefits of Korean Patent Application No. 10-2018-0065523 filed on Jun. 7, 2018 in the Korean Intellectual Property Office, the entire contents of which are incorporated herein by reference.

TECHNICAL FIELD

Exemplary embodiments of the present invention relate to a display device and a manufacturing method thereof.

DISCUSSION OF THE RELATED ART

As display devices become smaller, lighter, and thinner, it is desirable to improve the durability of the display devices with respect to cracks, scratches, etc., which may occur as a result of external impact.

A display device includes a display panel including pixels for displaying an image. When the display panel is cracked, foreign matter such as moisture may permeate into a display area of the display panel, causing defects.

A crack test of the display panel may be performed after an integrated circuit (IC) is mounted on the display panel. However, in a cell state, such a crack test may be unable to determine whether a crack is present in the display panel.

SUMMARY

Exemplary embodiments of the present invention are directed to a display device and a manufacturing method thereof capable of detecting whether a crack is generated in a display panel before and after an integrated circuit (IC) is mounted on a display panel. Exemplary embodiments further provide the efficient detection of a position of a crack generated in a display panel.

According to an exemplary embodiment, a display device includes a substrate including a display area and a non-display area disposed near the display area, a plurality of pixels disposed in the display area, a plurality of signal lines disposed on the substrate and connected to the pixels, and a pad portion disposed in the non-display area and including a plurality of pads. The signal lines include a first crack detecting line connected to a first test voltage pad and a first pad at a first node, connected to a second pad at a second node, and extending around the non-display area between the first node and the second node. The signal lines further include a first data line including a first end connected to a first transistor connected to the first crack detecting line at the second node, and a second end connected to corresponding pixels from among the plurality of pixels.

In an exemplary embodiment, the signal lines further include a plurality of second data lines, each including a first end connected to the first crack detecting line through a corresponding one of a plurality of second transistors and a second end connected to corresponding pixels from among the plurality of pixels.

In an exemplary embodiment, the signal lines further include a control line connected to gates of the first transistor and the second transistors.

In an exemplary embodiment, a crack of the first crack detecting line is detected by applying an enable-level voltage to the control line and applying a black gray voltage to the first test voltage pad.

In an exemplary embodiment, the display device further includes a first additional pad connected to the first pad, and a second additional pad connected to the second pad. The first and second additional pads are disposed in the non-display area. While a disable-level voltage is applied to the control line, a resistance of the first crack detecting line is measured using the first additional pad and the second additional pad.

In an exemplary embodiment, the display device further includes a data driving integrated circuit (IC) connected to the pad portion. The first test voltage pad, the first additional pad, and the second additional pad are in a floating state.

In an exemplary embodiment, the signal lines further include a first test voltage line including a first end connected to the first test voltage pad at the first node and a second end connected to the second transistors. The first test voltage line has a resistance corresponding to a line resistance of the first crack detecting line.

In an exemplary embodiment, the resistance of the first test voltage line is proportional to a magnitude of the line resistance.

In an exemplary embodiment, the non-display area includes a bendable area, and the signal lines include a second crack detecting line and a second data line. The second crack detecting line is connected to a second test voltage pad and a third pad at a third node, connected to a fourth pad at a fourth node, and extends around the bendable area between the third node and the fourth node. The second data line includes a first end connected to a second transistor connected to the second crack detecting line at the third node, and a second end connected to corresponding pixels from among the plurality of pixels.

In an exemplary embodiment, the first crack detecting line and the second crack detecting line respectively include a line reciprocating in a zigzag pattern along at least one side of the display area.

According to an exemplary embodiment, a method for manufacturing a display device includes manufacturing a display panel, testing for a crack in the display panel before mounting a driving integrated circuit (IC) to the display panel, mounting the driving IC to the display panel, and testing for a crack in the display panel again, after mounting the driving IC to the display panel, using the driving IC.

In an exemplary embodiment, manufacturing the display panel includes forming a plurality of pixels in a display area of a substrate, in which the substrate includes the display area and a non-display area disposed near the display area, forming a plurality of signal lines on the substrate, in which the signal lines are connected to the pixels, and forming a pad portion in the non-display area, in which the pad portion includes a plurality of pads. The signal lines include a first crack detecting line connected to a first test voltage pad and a first pad at a first node, connected to a second pad at a second node, and extending around the non-display area between the first node and the second node. The signal lines further include a first data line including a first end connected to a first transistor connected to the first crack detecting line at the second node, and a second end connected to corresponding pixels from among the plurality of pixels. The signal lines further include a plurality of second data lines, each including a first end connected to the first crack detecting line through a corresponding one of a plurality of second transistors and a second end connected to corresponding pixels from among the plurality of pixels. The signal lines further include a control line connected to gates of the first transistor and the second transistors.

In an exemplary embodiment, the method further includes measuring a resistance of the first crack detecting line when testing for the crack in the display panel again using the driving IC indicates that a crack has been detected.

In an exemplary embodiment, measuring the resistance of the first crack detecting line includes applying a disable-level voltage to the control line, and measuring the resistance of the first crack detecting line using a first additional pad and a second additional pad while applying the disable-level voltage to the control line. The first additional pad is connected to the first pad, and the second additional pad is connected to the second pad. The first and second additional pads are disposed in the non-display area.

In an exemplary embodiment, mounting the driving IC to the display panel includes connecting a data driving IC to the pad portion. Testing for a crack in the display panel again using the driving IC is performed while the first test voltage pad, the first additional pad, and the second additional pad are in a floating state.

In an exemplary embodiment, measuring the resistance of the first crack detecting line includes measuring, by the driving IC, the resistance of the first crack detecting line using the first pad and the second pad.

In an exemplary embodiment, testing for a crack in the display panel includes applying an enable-level voltage to the control line, and applying a black gray voltage to the first test voltage pad.

According to an exemplary embodiment, a display device includes a substrate including a display area and a non-display area disposed near the display area, in which the non-display area includes a bendable area, a plurality of pixels disposed in the display area, and a plurality of signal lines disposed on the substrate and connected to the pixels. The signal lines include a plurality of data lines connected to the pixels, a first crack detecting line connected to a first data line from among the plurality of data lines through a first transistor, in which the first crack detecting line is disposed in a portion of the non-display area that excludes the bendable area, a second crack detecting line connected to a second data line from among the plurality of data lines through a second transistor, in which the second crack detecting line is disposed in the bendable area, and a control line connected to a gate of the first transistor and a gate of the second transistor. The first crack detecting line includes a plurality of lines extending in a first direction, and at least one of the lines is disposed between a line disposed nearest to an edge of the substrate and a line disposed farthest from an edge of the substrate.

In an exemplary embodiment, the display device further includes a first test voltage pad disposed in the non-display area and connected to the first crack detecting line, a second test voltage pad disposed in the non-display area and connected to the second crack detecting line, and a data driving IC disposed in the non-display area and connected to the first and second crack detecting lines. The first and second test voltage pads are in a floating state.

In an exemplary embodiment, the data driving IC measures a resistance of the first crack detecting line and a resistance of the second crack detecting line.

According to exemplary embodiments, whether a crack is generated in the display panel may be efficiently and accurately detected before and after the IC is mounted on the display panel. In addition, the position of the crack in the display panel may be efficiently found.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
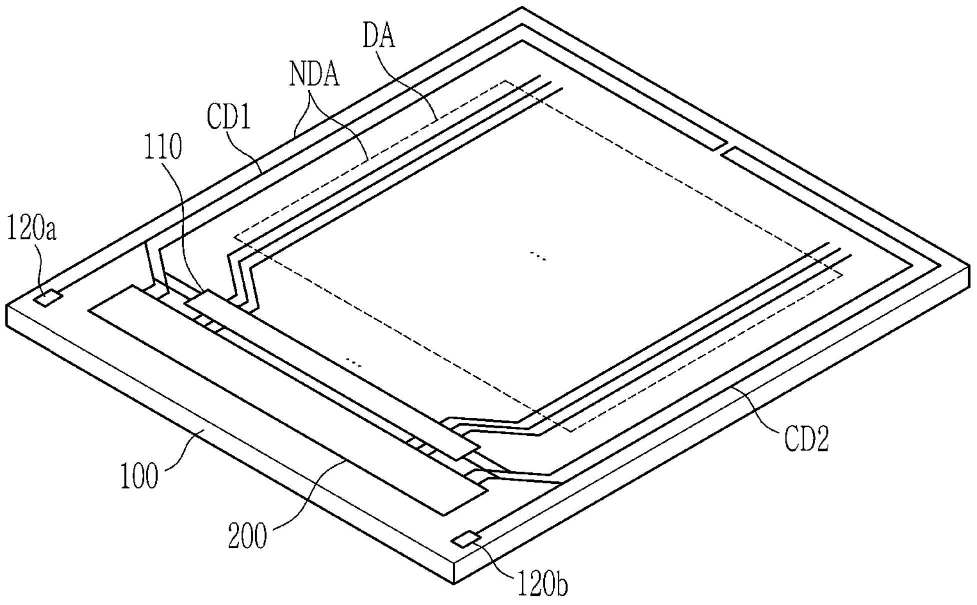
FIG. 1 shows a perspective view of a display device according to an exemplary embodiment of the present invention.

Exemplary embodiments of the present invention will be described more fully hereinafter with reference to the accompanying drawings. Like reference numerals may refer to like elements throughout the accompanying drawings.

It will be understood that when an element such as a layer, film, region, or substrate is referred to as being "on" another element, it can be directly on the other element or intervening elements may also be present.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

Figure 2:
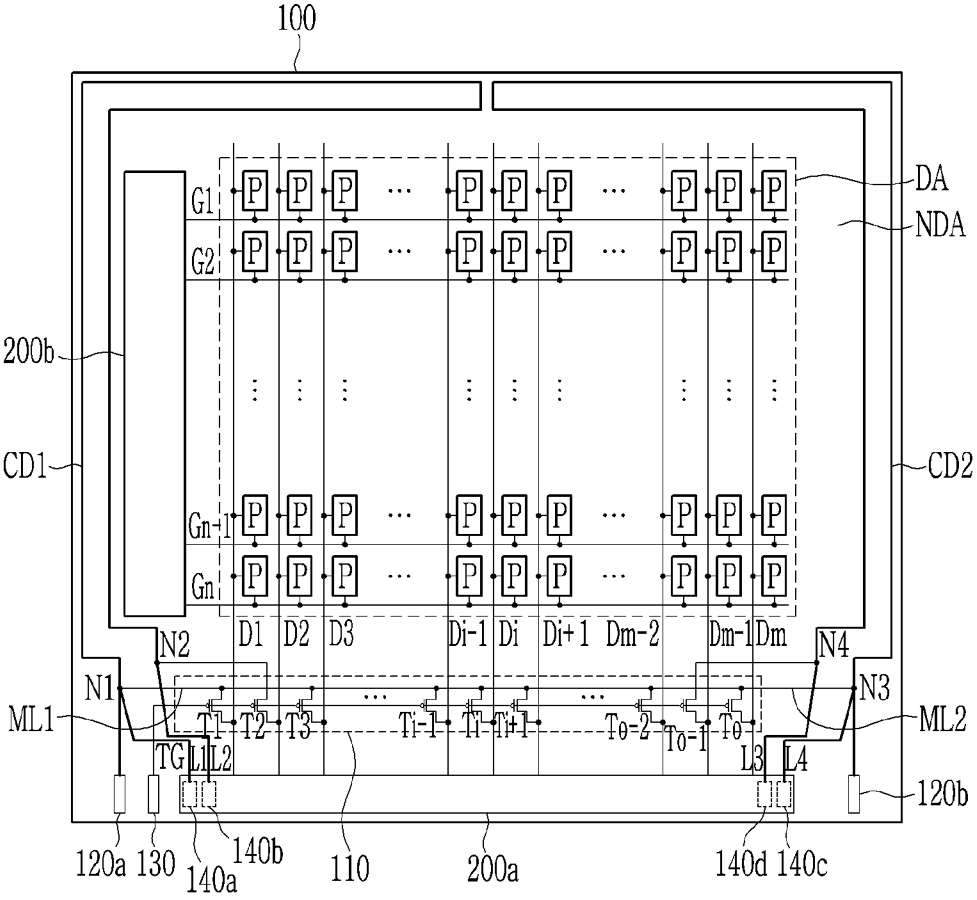
FIG. 2 shows a layout view of a display device according to an exemplary embodiment of the present invention.

A display device according to an exemplary embodiment will now be described with reference to FIGS. 1 and 2. FIG. 1 shows a perspective view of a display device according to an exemplary embodiment of the present invention. FIG. 2 shows a layout view of a display device according to an exemplary embodiment of the present invention.

Referring to FIG. 1, the display device includes a display panel including a substrate 100, a driving circuit portion 200, and test voltage pads 120*a* and 120*b*.

The substrate 100 is an insulating substrate including, for example, glass, a polymer, or stainless steel. The substrate 100 may be flexible, stretchable, foldable, bendable, or rollable. As a result, the display device may be flexible, stretchable, foldable, bendable, or rollable. For example, the substrate 100 may have a flexible film including a resin such as a polyimide.

In the exemplary embodiment shown in FIG. 1, a non-display area NDA surrounds the display area DA. However, the present invention is not limited thereto. For example, in an exemplary embodiment, the non-display area NDA may be disposed on either side or respective sides of the display area DA.

The display panel includes the display area DA, in which an image is displayed, and a non-display area NDA disposed near the display area DA, in which elements and/or signal lines for generating and/or transmitting various signals applied to the display area DA are formed.

A plurality of pixels and signal lines that apply signals used to drive a plurality of pixels may be disposed in the display area DA.

Crack detecting lines CD1 and CD2, a test controller 110 that detects defects of the crack detecting lines, and the driving circuit portion 200 that drives the plurality of pixels may be disposed in the non-display area NDA. The pixels are not disposed in the non-display area NDA.

The driving circuit portion 200 may be bonded to the substrate 100 of the display panel by a chip-on-glass process or a chip-on-plastic process. Alternatively, the driving circuit portion 200 may be simultaneously formed with a plurality of data lines D1 through Dm, a plurality of scanning lines, and a plurality of pixels P according to an amorphous silicon TFT gate driver (ASG) scheme or a gate-driver-in-panel (GIP) scheme. The driving circuit portion 200 is mounted on a tape carrier package (TCP) or a flexible film, and the tape carrier package (TCP) or the flexible film on which the driving circuit portion 200 is mounted may be attached to the substrate 100 of the display panel according to a tape automated bonding (TAB) process.

As shown in FIG. 2, the display area DA of the substrate 100 includes the plurality of pixels P, the plurality of data lines D1 through Dm, and a plurality of gate lines G1 through Gn connected to the pixels P. Each pixel P is a minimum unit for displaying an image. The plurality of pixels P may substantially have a matrix form and may be disposed in the display area.

The test voltage pads 120*a* and 120*b*, a test control pad 130, the test controller 110, and the driving circuit portions 200*a* and 200*b* may be disposed in the non-display area NDA of the substrate 100. The driving circuit portion 200*a* may be a data driver 200*a*, and the driving circuit portion 200*b* may be a gate driver 200*b*.

The test voltage pads 120*a* and 120*b* are connected to first ends of test transistors T1 through To. A same test voltage or different test voltages may be supplied to the test voltage pads 120*a* and 120*b*. The test voltage pads 120*a* and 120*b* are in a floating state after the driving circuit portion 200*a* is combined (e.g., after the driving circuit portion 200*a* is mounted to the display panel).

The test control pad 130 is connected to respective gates of the test transistors T1 through To. A test control signal is supplied to the test control pad 130.

The test controller 110 includes the plurality of test transistors T1 through To. The test transistors T1 through To may be disposed between the display area DA and the driving circuit portion 200*a* in the non-display area NDA. The test transistors T1 through To are connected between the data lines D1 through Dm and the test voltage pads 120*a* and 120*b*.

A line TG connected to the gates of the test transistors T1 through To is connected to the test control pad 130. The gates of the test transistors T1 through To and the line TG may be a single line. The line TG may be referred to herein as a control line.

Respective gates of the test transistors T1 through To are connected to the test control pad 130 through the line TG, one of the ends (e.g., a first end) of the test transistors T1 through To is connected to one of the test voltage pads 120*a* and 120*b*, and another one of the ends (e.g., a second end) of the test transistors T1 through To is connected to one of the data lines D1 through Dm.

The corresponding crack detecting lines CD1 and CD2 may be connected between the respective first ends of the test transistors T2 and To-1 from among the test transistors T1 through To and the corresponding test voltage pads 120*a* and 120*b*.

The first crack detecting line CD1 may be connected between the first end of the test transistor T2 connected to the data line D2 and the test voltage pad 120*a*. The second crack detecting line CD2 may be connected between the first end of the test transistor To-1 connected to the data line Dm-1 and the test voltage pad 120*b*.

The first crack detecting line CD1 and the second crack detecting line CD2 may be disposed in the non-display area NDA disposed outside of the display area DA.

The first crack detecting line CD1 and the second crack detecting line CD2 may be disposed further outside than the gate driver 200*b*. For example, the gate driver 200*b* may be disposed between the display area DA and the first crack detecting line CD1 in the non-display area NDA.

The first crack detecting line CD1 and the second crack detecting line CD2 may be lines that extend around an external side of the display area DA. For example, the first crack detecting line CD1 may be disposed on the left outside portion of the display area DA, and the second crack detecting line CD2 may be disposed on the right outside portion of the display area DA, as shown in FIG. 2. For example, the first crack detecting line CD1 may be disposed such that it extends around the left outside portion of the display area DA, and the second crack detecting line CD2 may be disposed such that it extends around the right outside portion of the display area DA.

Corresponding test voltage lines ML1 and ML2 may be connected at a node N1 and a node N3 between first ends of the test transistors T1, T3 through To-2, and To, not connected to the first crack detecting line CD1 and the second crack detecting line CD2 and the test voltage pads 120*a* and 120*b*.

In an exemplary embodiment, the first crack detecting line CD1 may be connected to the test voltage pad 120*a* and pad 140*a* at node N1, and connected to pad 140*b* at node N2. In addition, as shown in FIG. 2, the first crack detecting line CD1 may extend around the non-display area NDA between the nodes N1 and N2.

The driving circuit portion may include the data driver 200*a* connected to data pads connected to a plurality of data lines D1 through Dm and supplying a data voltage, and the gate driver 200*b* supplying a gate signal to the plurality of gate lines G1 through Gn.

In the exemplary embodiments described herein, the data driver 200*a* will be described to be mounted as a data driving IC on the substrate. The data driving IC 200*a* may be connected to pads 140*a* through 140*d* for supplying a voltage and/or a current used to perform a crack test to the crack detecting lines CD1 and CD2.

The data driving IC 200*a* may be connected to lines L1 through L4 connected to the first crack detecting line CD1 and the second crack detecting line CD2 through the pads 140*a* through 140*d*. The lines L1 through L4, at the respective nodes N1 through N4, are connected to the first crack detecting line CD1 and the second crack detecting line CD2.

It has been described in the exemplary embodiment described with reference to FIG. 2 that the gate driver 200*b* is disposed on the left side of the non-display area NDA, and the data driving IC 200*a*, the test transistors T1 through To, the test voltage pads 120*a* and 120*b*, and the test control pad 130 are disposed on the lower side of the non-display area NDA. However, the disposal of the signal line, the pad portions, the transistors, and the drivers in the non-display area NDA is not limited thereto.

A method for detecting a defect of a display device of FIG. 2 will now be described with reference to FIGS. 3 to 5.

Figure 3:
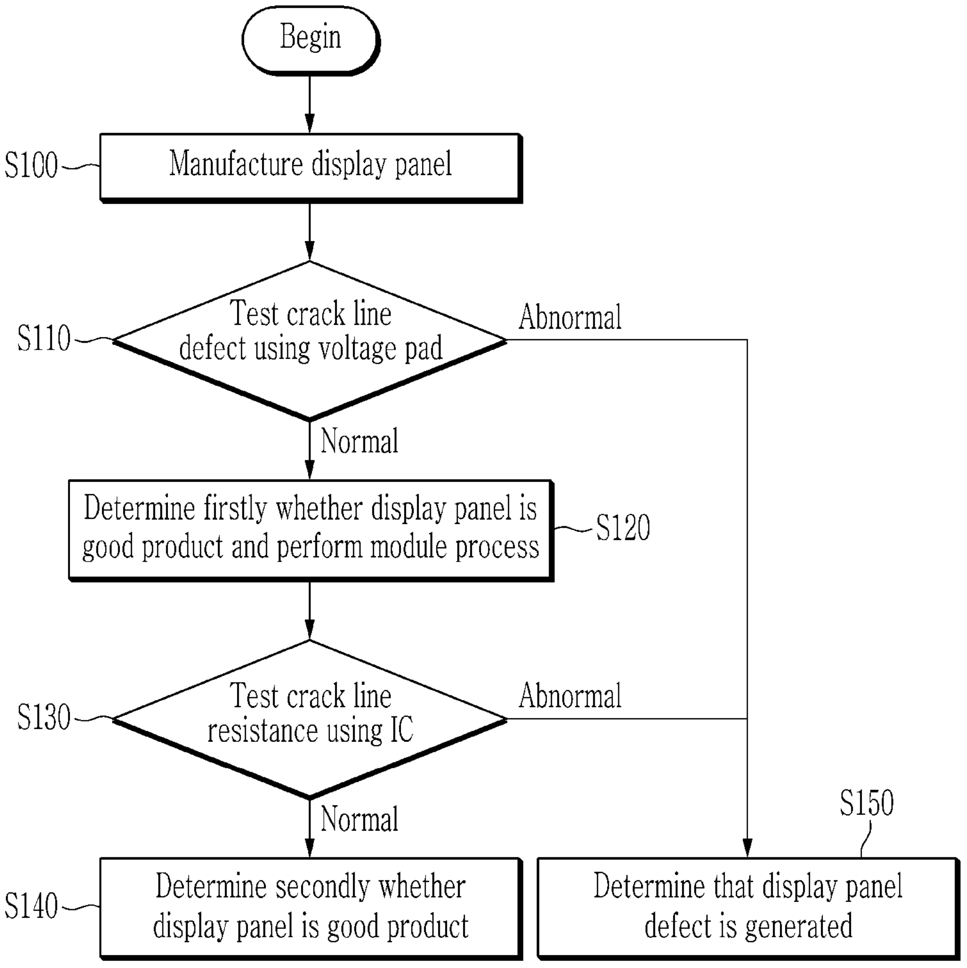
FIG. 3 shows a flowchart of a method for manufacturing a display device according to an exemplary embodiment of the present invention.

FIG. 3 shows a flowchart of a method for manufacturing a display device according to an exemplary embodiment of the present invention. FIG. 4 shows a waveform diagram of signals applied to a display device according to an exemplary embodiment of the present invention. FIG. 5 shows a display area of a display device to which a test signal is applied.

Figure 4:
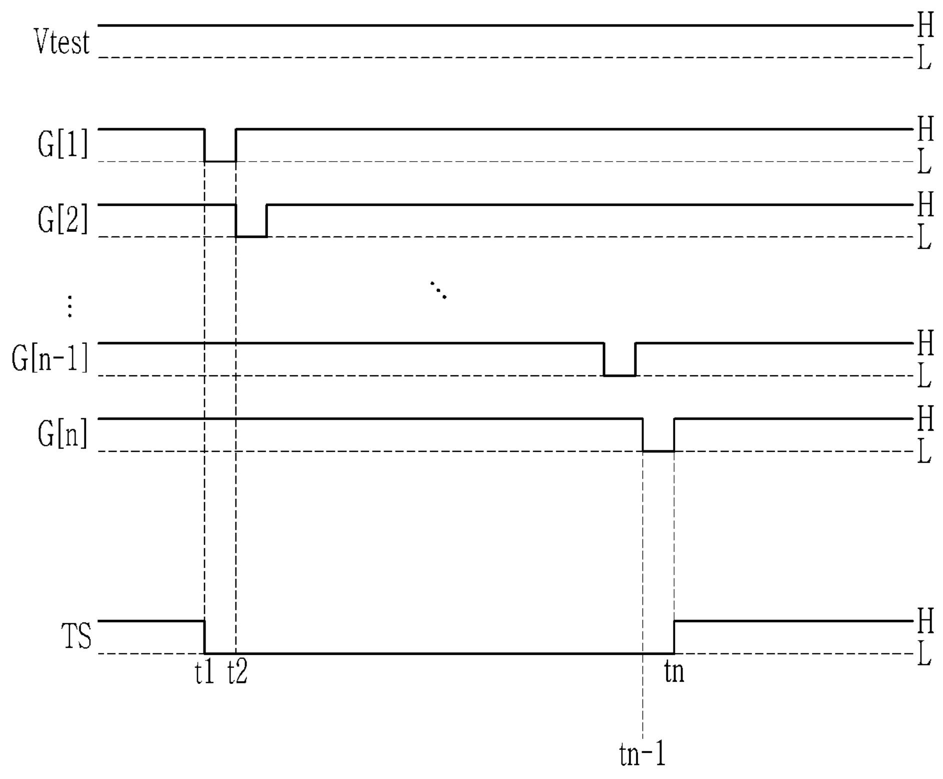
FIG. 4 shows a waveform diagram of signals applied to a display device according to an exemplary embodiment of the present invention.

Referring to FIGS. 3 and 4, the display panel is manufactured (S100). The manufactured display panel may be, for example, the display panel shown in FIG. 2. Thus, manufacturing the display panel includes, for example, forming the pixels P in the display area DA of the substrate 100, forming the signal lines described herein on the substrate 100, and forming a pad portion including the pads described herein in the non-display area NDA. Defects of the crack line are tested by applying a predetermined voltage to the test voltage pads 120*a* and 120*b* (S110).

When a test control signal TS applied to the test control pad 130 is at an enable level L (e.g., when the test control signal TS is an enable-level voltage), the test transistors T1 through To may be turned on. The test control signal TS may be applied to the transistors T1 through To via the control line TG. A test voltage Vtest applied to the test voltage pads 120*a* and 120*b* may have a voltage level corresponding to a black gray. The test voltage will be assumed to be at a disable level H. The test voltage may then be supplied to the data lines D1 through Dm through the turned on test transistors T1 through To.

The gate signals G[1] through G[n] may be sequentially changed to the enable level L for periods t1 through to in which the test control signal TS is at the enable level L. For example, the gate signal G[1] is changed to the enable level L for t1, and is changed to the disable level H for t2. The gate signal G[2] is changed to the enable level L for t2.

Although the enable level in the exemplary embodiments described herein is the low level L and the disable level in the exemplary embodiments described herein is the high level H, the present invention is not limited thereto. For example, in exemplary embodiments, the enable level may be the high level H and the disable level may be the low level L.

As the gate signals G[1] through G[n] are applied to the pixels P, the test voltage may be written to the pixels P. The pixel P expresses the black gray by the test voltage written to the pixel P.

However, when a crack is generated in the display panel, the data lines D1 through Dm or the first and second crack detecting lines CD1 and CD2 may be opened, or line resistance of the data lines D1 through Dm or the first and second crack detecting lines CD1 and CD2 may be increased.

For example, when a crack is generated in the display panel in which the data line D2 or the first crack detecting line CD1 is opened, the test voltage is not applied to the data line D2.

As another example, when a crack is generated in the display device and line resistance of the data line D2 or the first crack detecting line CD1 increases, a test voltage applied to the data line D2 has a predetermined level that is lower than the disable level H because of a voltage drop caused by the increase of line resistance.

Therefore, the voltage supplied to the pixel connected to the data line D2 has a lower level than the disable level H. The pixels connected to the data line D2 express a white gray that is brighter than the black gray to a grey gray by the voltage with a lower level. That is, a bright line may be expressed by the pixels connected to the data line D2.

Figure 5:
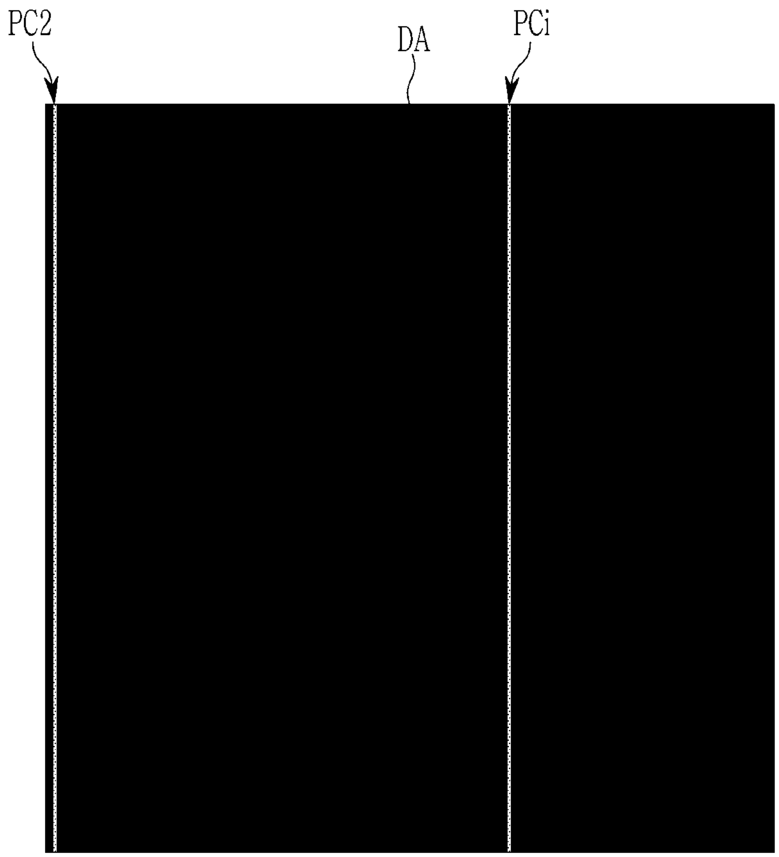
FIG. 5 shows a display area of a display device to which a test signal is applied.

As shown in FIG. 5, the pixels PC2 connected to the data line D2 for receiving a test voltage express the white gray to the grey gray by the first crack detecting line CD1. As a result, the bright line shown in FIG. 5 may be visible. Thus, it may be determined that a crack is generated in the region in which the first crack detecting line CD1 is disposed in the non-display area NDA.

The bright line may be expressed by the pixels PCi connected to the data line Di connected to the test transistor Ti not connected to the first and second crack detecting lines CD1 and CD2. This may be determined to be generated not by a crack in the display device, but by another factor.

Pixels PCm-1 refer to pixels P connected to the data line Dm-1 (see FIG. 2). The pixels PCm-1 connected to the data line Dm-1 for receiving a test voltage express the black gray by the second crack detecting line CD2, so a dark line may be visible. This may be determined to be the case because no crack is generated in the region in which the second crack detecting line CD2 is disposed in the non-display area NDA.

As described above, whether the display device is cracked may be determined by the bright line that is seen according to an opened state of the data lines D1 through Dm, or a change of line resistance and an opened state of the crack detecting lines CD1 and CD2 formed outside the display area DA or a change of line resistance in S110. Further, a generated position of the crack may be checked according to the position where the bright line is seen.

When the bright line is expressed by the pixels PC2 or PCm-2 respectively connected to the data line D2 or Dm-2 for receiving a test voltage from the crack detecting lines CD1 and CD2, it is determined that a crack is generated in the display panel (S150).

When the bright line is not seen in S110, the display panel is determined to be a good product (e.g., no cracks are detected), and a module process for mounting a data driving IC 200*a* on the display panel is performed (S120).

After the module process is performed, resistance of the crack detecting lines CD1 and CD2 is tested through the data driving IC 200*a* (S130). When the resistance of the crack detecting lines CD1 and CD2 is tested, a test control signal TS at the disable level H is applied to the test control pad 130, and the test transistors T1 through To are turned off.

The data driving IC 200*a* may measure resistance of the crack detecting line CD1 using the line L1 and the line L2 connected to the crack detecting line CD1, and may measure resistance of the crack detecting line CD2 using the line L3 and the line L4 connected to the crack detecting line CD2.

In an exemplary embodiment, the data driving IC 200*a* includes a variable resistor, and may measure resistance of the crack detecting lines CD1 and CD2 by comparing resistance of the crack detecting lines CD1 and CD2 and the variable resistor. However, the method for measuring resistance according to an exemplary embodiment is not limited thereto.

When the measured resistance is within a predetermined range, it is determined that no crack is generated in the crack detecting lines CD1 and CD2 (S140). That is, the display panel is again determined to be a good product.

When the measured resistance exceeds a predetermined range, it is determined that a crack is generated in the crack detecting lines CD1 and CD2 (S150).

As described above, exemplary embodiments provide a display device and a manufacturing method thereof in which it may be efficiently detected whether a crack is generated in the display panel both before and after a driving IC is mounted on the display panel. For example, referring to FIG. 3, the display device is first determined to be free of defects before the data driving IC 200*a* is mounted in S120, and is again determined to be free of defects after the data driving IC 200*a* is mounted in S140. Further, exemplary embodiments provide a display device and manufacturing method thereof in which the position of the crack in the display panel may be efficiently determined.

A display device and a manufacturing method thereof according to an exemplary embodiment will now be described with reference to FIGS. 6 to 9.

Figure 6:
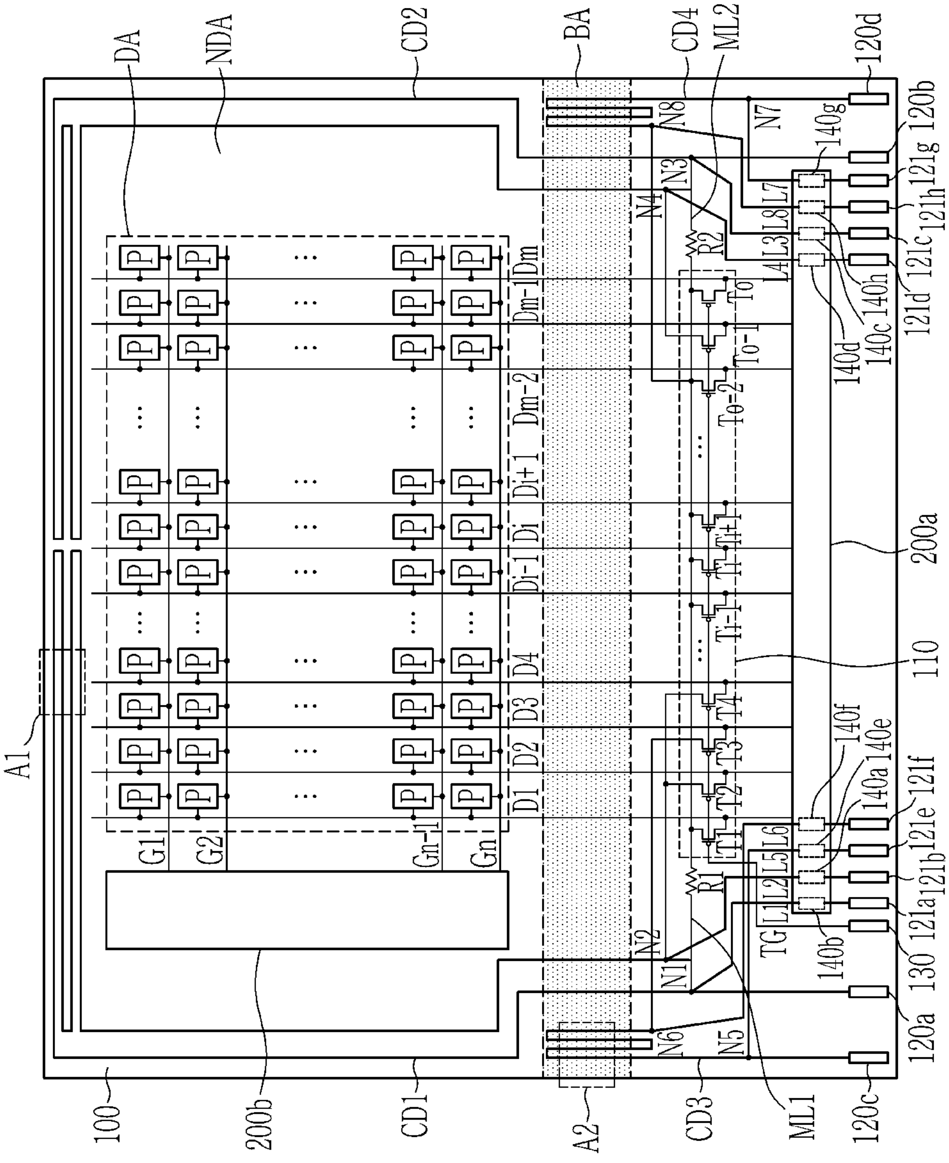
FIG. 6 shows a layout view of a display device according to an exemplary embodiment of the present invention.
Figure 7:
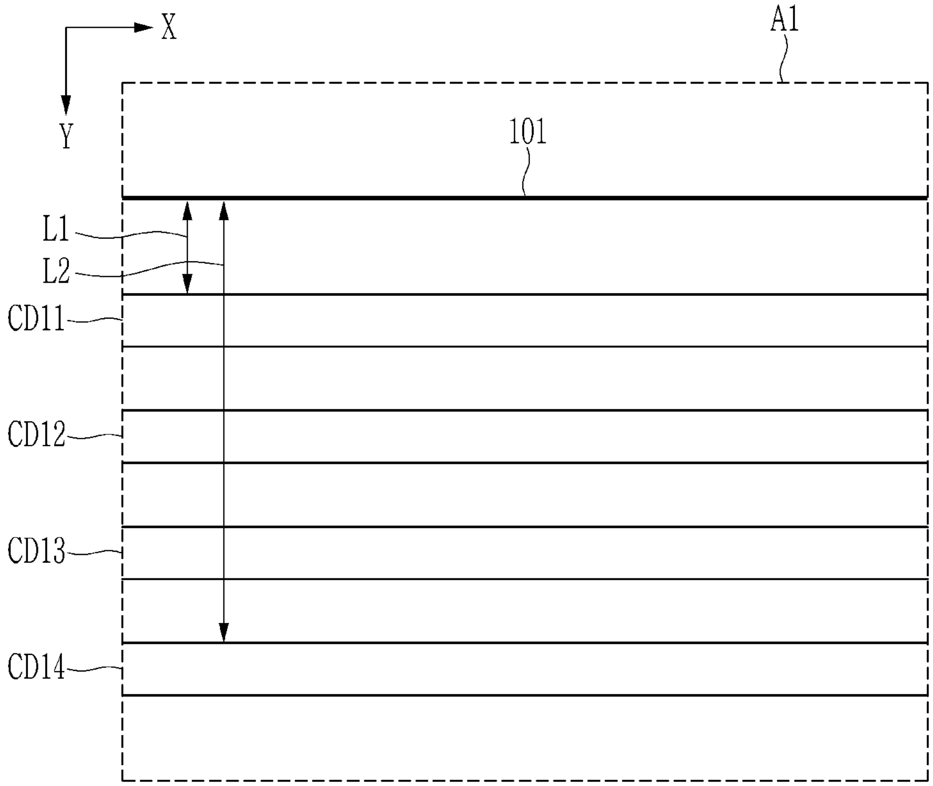
FIG. 7 shows a first portion of the display device of FIG. 6.
Figure 8:
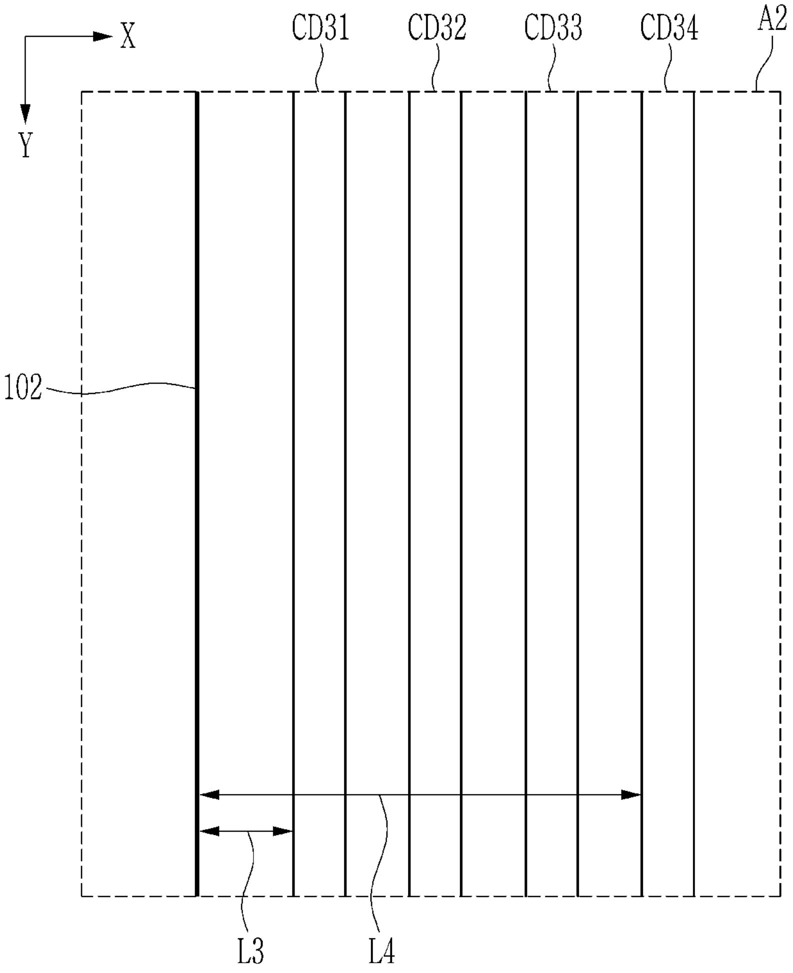
FIG. 8 shows a second portion of the display device of FIG. 6.

FIG. 6 shows a layout view of a display device according to an exemplary embodiment of the present invention. FIG. 7 shows a first portion of the display device of FIG. 6. FIG. 8 shows a second portion of the display device of FIG. 6.

For convenience of explanation, a further description of the same or similar configurations and elements previously described with reference to the display device shown in FIG. 2 will be omitted when describing the display device shown in FIG. 6.

The non-display area NDA may include a bendable area BA. In FIG. 6, the bendable area BA is shown as being disposed on a lower side of the display area DA. However, the position and the number of bendable areas BA is not limited thereto. The bendable area BA indicates a region that is bent and a region that will be bent in a subsequent process.

Test voltage pads 120*a*, 120*b*, 120*c*, and 120*d* are connected to first ends of the test transistors T1 through To. The same test voltage or different test voltages may be supplied to the test voltage pads 120*a*, 120*b*, 120*c*, and 120*d*. Periods in which the test voltage is applied to the test voltage pads 120*a*, 120*b*, 120*c*, and 120*d* may be the same or different.

The test transistors T1 through To are connected between the data lines D1 through Dm and the test voltage pads 120*a*, 120*b*, 120*c*, and 120*d*.

Respective gates of the test transistors T1 through To may be connected to the test control pad 130 through the line TG, a first end of the test transistors T1 through To may be connected to one of the test voltage pads 120*a*, 120*b*, 120*c*, and 120*d*, and a second end of the test transistors T1 through To may be connected to a corresponding one from among the data lines D1 through Dm.

The corresponding crack detecting lines CD1 and CD2 may be connected between respective first ends of some test transistors T2, T4, and To-1 from among the test transistors T1 through To and corresponding test voltage pads 120*a* and 120*b*.

The corresponding crack detecting lines CD3 and CD4 may be connected between respective first ends of some test transistors T3 and To-2 from among the test transistors T1 through To and corresponding test voltage pads 120*c* and 120*d*.

The first crack detecting line CD1 may be connected among the first end of the test transistor T2 connected to the data line D2, the first end of the test transistor T4 connected to the data line D4, and the test voltage pad 120*a*. The second crack detecting line CD2 may be connected between the first end of the test transistor To-1 connected to the data line Dm-1 and the test voltage pad 120*b*.

The third crack detecting line CD3 may be connected between the first end of the test transistor T3 connected to the data line D3 and the test voltage pad 120*c*. The fourth crack detecting line CD4 may be connected between the first end of the test transistor To-2 connected to the data line Dm-2 and the test voltage pad 120*d*.

The first crack detecting line CD1 and the second crack detecting line CD2 may be respectively disposed in the non-display area NDA disposed outside of the display area DA. The first crack detecting line CD1 and the second crack detecting line CD2 may respectively extend along two sides of the display area.

The first crack detecting line CD1 may be a line reciprocating (e.g., moving alternately back and forth) in a zigzag pattern along one side of the display area DA. The second crack detecting line CD2 may be a line reciprocating (e.g., moving alternately back and forth) in a zigzag pattern along one side of the display area DA. The first and second crack detecting lines CD1 and CD2 may be lines reciprocating (e.g., moving alternately back and forth) in a zigzag pattern in the non-display area NDA excluding the bendable area BA. The first and second crack detecting lines CD1 and CD2 may be a single line, and may be disposed such that they extend along the circumference of the display area DA. However, the placement of the first and second crack detecting lines CD1 and CD2 is not limited thereto.

A position and a form of the first crack detecting line CD1 and the second crack detecting line CD2 will now be described with reference to FIG. 7, which is an enlarged view of the area A1 in FIG. 6.

The first crack detecting line CD1 is disposed in an area A1. The first crack detecting line CD1 includes a plurality of lines CD11, CD12, CD13, and CD14 extending in different directions.

The respective lines CD11, CD12, CD13, and CD14 extend in an X-axis direction. For example, the lines CD11 and CD13 extend in a positive X-axis direction, and the lines CD12 and CD14 extend in a negative X-axis direction.

Further, a plurality of lines CD11, CD12, CD13, and CD14 are disposed so that they may have different shortest distances from an edge 101 of the substrate 100. For example, the line CD11 is disposed to be separated from the edge 101 of the substrate 100 by a length L1 in a Y-axis direction, and the line CD14 is disposed to be separated from the edge 101 of the substrate 100 by a length L2 in the Y-axis direction.

In this instance, at least one line CD12 and/or CD13 may be disposed between the line CD11 disposed nearest the edge 101 of the substrate 100 and the line CD14 disposed farthest the edge 101 of the substrate 100, and the third crack detecting line CD3 and the fourth crack detecting line CD4 may be respectively disposed in the bendable area BA of the non-display area NDA. The third crack detecting line CD3 may be a line reciprocating (e.g., moving alternately back and forth) in a zigzag pattern in the bendable area BA. The fourth crack detecting line CD4 may be a line reciprocating (e.g., moving alternately back and forth) in a zigzag pattern in the bendable area BA. The third and fourth crack detecting lines CD3 and CD4 may be a single line, and may be disposed such that they extend along the circumference of the display area DA. However, the placement of the third and fourth crack detecting lines CD3 and CD4 is not limited thereto.

A position and a form of the third crack detecting line CD3 and the fourth crack detecting line CD4 will now be described with reference to FIG. 8, which is an enlarged view of the area A2 in FIG. 6. The third crack detecting line CD3 is disposed in the area A2. The first crack detecting line CD3 includes a plurality of lines CD31, CD32, CD33, and CD34 extending in different directions.

The respective lines CD31, CD32, CD33, and CD34 extend in the Y-axis direction. For example, the lines CD31 and CD33 extend in a positive Y-axis direction, and the lines CD32 and CD34 extend in a negative Y-axis direction.

A plurality of lines CD31, CD32, CD33, and CD34 are disposed so that they may have different shortest distances from an edge 102 of the substrate 100. For example, the line CD31 is disposed to be separated from the edge 102 of the substrate 100 by a length L3 in the X-axis direction, and the line CD34 is disposed to be separated from the edge 102 of the substrate 100 by a length L4 in the X-axis direction.

In this instance, at least one line CD32 and/or CD33 may be disposed between the line CD31 disposed nearest the edge 102 of the substrate 100 and the line CD34 disposed farthest the edge 102 of the substrate 100.

When the first crack detecting line CD1 and the third crack detecting line CD3 are disposed on the same side (e.g., a left side) in the non-display area NDA, they are disposed in different areas. As a result, the position at which the crack is generated in the display panel may be more accurately detected. The second crack detecting line CD2 and the fourth crack detecting line CD4 also have the same effect.

The corresponding test voltage lines ML1 and ML2 may be connected at the node N1 and the node N3 between the first ends of the test transistors T1, Ti−1 through Ti+1, To, etc., not connected to the first to fourth crack detecting lines CD1 through CD4 and the test voltage pads 120*a* and 120*b*.

Resistors R1 and R2 may be further disposed in the non-display area NDA. The resistors R1 and R2 may be formed by the first test voltage line ML1 or the second test voltage line ML2. The resistor R1 may be disposed between the first node N1 and the second end of the test transistor T1.

The resistors R1 and R2 may be formed to compensate for a voltage difference between test voltage values applied to the data lines D2, D4, and Dm-1 and test voltages applied to the data lines D1, Di−1 through Di+1, Dm, etc., by line resistance of the first crack detecting line CD1 and the second crack detecting line CD2.

That is, the resistors R1 and R2 may be connected between first ends of the test transistors T1, Ti−1 through Ti+1, To, etc., not connected to the first to fourth crack detecting lines CD1 through CD4 and the first test voltage line ML1 and the second test voltage line ML2 for connecting the test voltage pads 120*a* and 120*b*.

In this instance, deviation of the test voltage caused by the line resistance of the crack detecting line CD1 may be minimized or reduced by designing resistance of the resistor R1 by use of line resistance of the crack detecting line CD1. For example, the resistance of the resistor R1 may be designed according to Equation 1.

$$R = \frac{R_{CD}}{k} \times T \times 1.25 \qquad \text{(Equation 1)}$$

Here, R is the resistance of the resistor R1, $R_{CD}$ is the line resistance of the crack detecting line CD1, k is the number of data lines connected to the first test voltage line ML1, and T is the number of data lines connected to the crack detecting line CD1. In this instance, 1.25 is a modifiable constant that is a positive integer greater than 0.

The resistor R1 may be designed by changing the form of the first test voltage line ML1 in the region in which the first test voltage line ML1 is disposed. For example, the resistor R1 satisfying the resistance calculated by Equation 1 may be formed by controlling a thickness, a length, or a width of the first test voltage line ML1.

The first test voltage line ML1 may be disposed in a region disposed between a region in which the test voltage pad 120*a* is disposed and a region in which the first end of the test transistor T1 is disposed, so a region in which a line for the resistor R1 is disposed may be obtained.

According to exemplary embodiments, the resistance of the first test voltage line ML1 may be proportional to a magnitude of the line resistance.

The method for designing the resistance of the resistor R1 has been described. The resistance of the resistor R2 may be designed in a similar manner.

Pads 140*a* through 140*h* are connected to the crack detecting lines CD1 through CD4. For example, a first end of the crack detecting line CD1 is connected to a pad 121*a*, and a second end is connected to a pad 121*b*. A first end of the crack detecting line CD3 is connected to a pad 121*e*, and a second end is connected to a pad 121*f*.

A data driving IC 200*a* may be connected to the pads 140*a* through 140*h*. The data driving IC 200*a* may supply a voltage and/or a current for testing for cracks to the crack detecting lines CD1 through CD4 through the pads 140*a* through 140*h*.

Additional pads 121*a* through 121*h* connected to the pads 140*a* through 140*h* are disposed in the non-display area NDA. Before connection of the data driving IC 200*a*, the voltage and/or the current for testing for cracks may be supplied to the crack detecting lines CD1 through CD4 through the additional pads 121*a* through 121*h*. The additional pads 121*a* through 121*h* are combined with the data driving IC 200*a*, and are then in the floating state.

The data driving IC 200*a* may be connected to the lines L1 through L4 connected to the first crack detecting line CD1 and the second crack detecting line CD2 through the pads 140*a* through 140*d*. The lines L1 through L4 are connected, at the respective nodes N1 through N4, to the first crack detecting line CD1 and the second crack detecting line CD2.

For example, the line L1 is connected to the node N1 at which the test voltage line ML1 is connected to the first crack detecting line CD1. The resistor R1 is connected between the node N1 and the first end of the test transistor T1. The line L2 is connected to the node N2 disposed between the first crack detecting line CD1 and the first end of the test transistor T2. That is, the lines L1 and L2 are connected to the node N1 where the first crack detecting line CD1 extends to the outside of the display area DA from the test voltage pad 120*a*, and the node N2 where the first crack detecting line CD1 is drawn out to the test transistor T2 from the outside of the display area DA.

In a similar manner, the line L3 is connected to the node N3 where the test voltage line ML2 is connected to the second crack detecting line CD2. The resistor R2 is connected between the node N3 and the first end of the test transistor To. The line L4 is connected to the node N4 disposed between the second crack detecting line CD2 and the first end of the test transistor To-1. That is, the lines L3 and L4 are connected to the node N3 where the second crack detecting line CD2 extends to the outside of the display area DA from the test voltage pad 120*b*, and the node N4 where the second crack detecting line CD2 is drawn out to the test transistor To from the outside of the display area DA.

The data driving IC 200*a* may be connected to the lines L5 through L8 connected to the third crack detecting line CD3 and the fourth crack detecting line CD4 through the pads 140*e* through 140*h*. The lines L5 through L8 are connected, at the respective nodes N5 through N8, to the third crack detecting line CD3 and the fourth crack detecting line CD4.

For example, the line L5 is connected to the node N5 where the third crack detecting line CD3 extends to the outside of the display area DA from the test voltage pad 120*c*. The line L6 is connected to the node N6 where the third crack detecting line CD3 is drawn out to the test transistor T3 from the outside of the display area DA.

In a similar manner, the line L7 is connected to the node N7 where the fourth crack detecting line CD4 extends to the outside of the display area DA from the test voltage pad 120*d*. The line L6 is connected to the node N8 where the fourth crack detecting line CD3 is drawn out to the test transistor To-2 from the outside of the display area DA.

In the exemplary embodiment described with reference to FIG. 5, it is illustrated that the gate driver 200*b* is disposed on the left side of the non-display area NDA, and the data driving IC 200*a*, the test transistors T1 through To, the test voltage pads 120*a* through 120*d*, and the test control pad 130 are disposed on the lower side of the non-display area NDA. However, the disposal of the signal lines, the pad portions, the transistors, and the drivers of the non-display area NDA is not limited thereto.

A method for detecting a defect of the display device of FIG. 6 will now be described with reference to FIG. 9.

Figure 9:
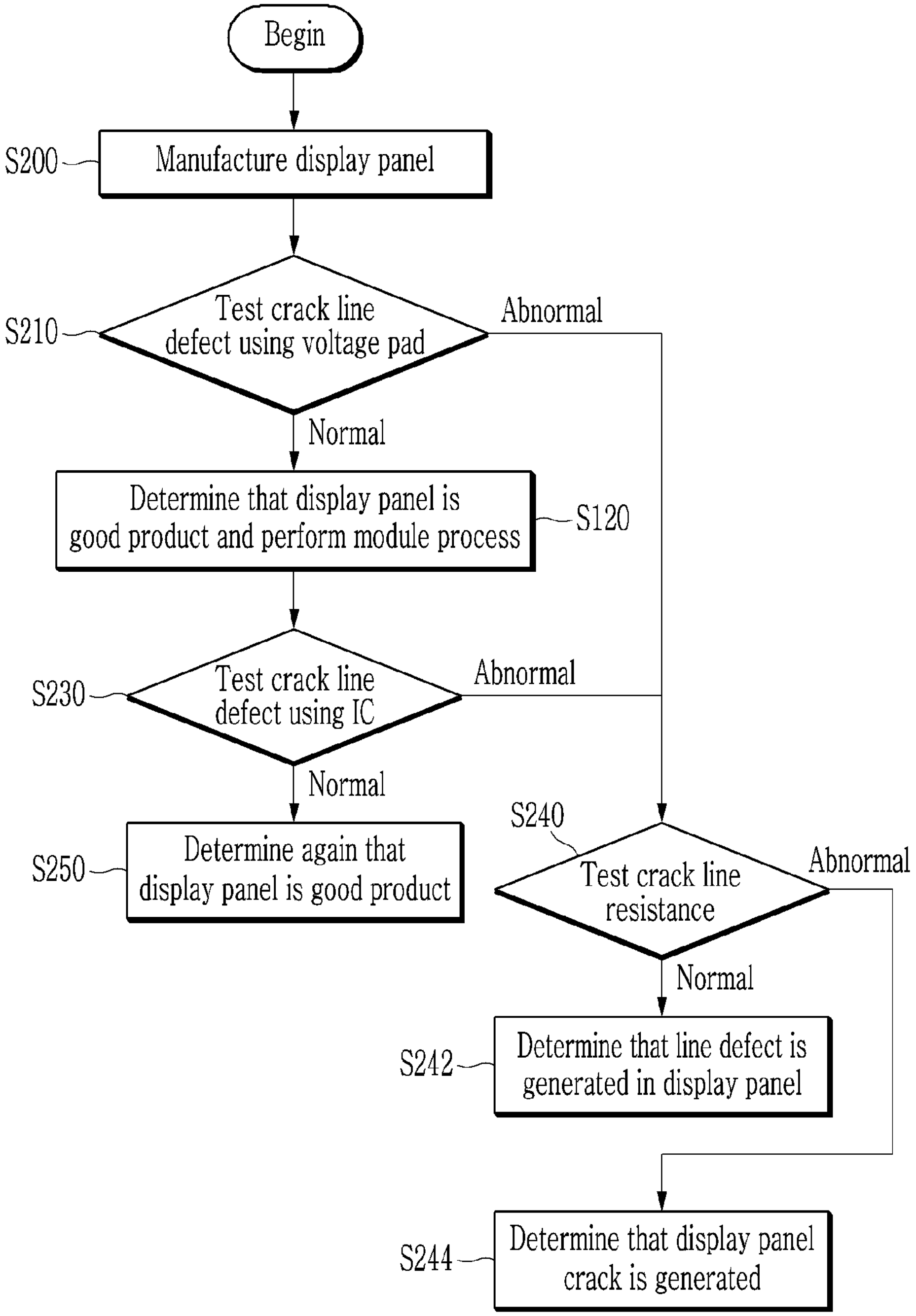
FIG. 9 shows a flowchart of a method for manufacturing a display device according to an exemplary embodiment of the present invention.

FIG. 9 shows a flowchart of a method for manufacturing a display device according to an exemplary embodiment of the present invention.

A display panel is manufactured (S200). The manufactured display panel may be, for example, the display panel shown in FIG. 6.

A predetermined voltage is applied to the test voltage pads 120*a* through 120*d* to test whether the crack line has a defect (S210). In a manner similar to that of S110 of FIG. 3, a bright line may be expressed by the pixels connected to the data line connected to the crack detecting line.

In S210, when the bright line is expressed by the pixels connected to the data lines D2 and D4, D3, Dm-2, or Dm-1 for receiving a test voltage through the crack detecting lines CD1 through CD4, the resistance of the crack detecting lines CD1 through CD4 is tested (S240).

In S240, when the resistance of the crack detecting lines CD1 through CD4 is tested, a test control signal TS at a disable level H is applied to the test control pad 130 so that the test transistors T1 through To are in an off state.

The resistance may be measured, for example, by applying a current to the additional pad connected to the crack detecting line corresponding to the bright line from among the additional pads 121*a* through 121*h*. When the bright line is expressed by the pixels connected to the data line Dm-1, the resistance of the crack detecting line CD2 may be measured through the additional pads 121*c* and 121*d* connected to the crack detecting line CD2 corresponding to the data line Dm-1.

In S210, when the bright line caused by the pixels connected to the data lines D2 and D4, D3, Dm-2, or Dm-1 for receiving a test voltage through the crack detecting lines CD1 through CD4 is not seen, the display panel is determined to be a good product, and a module process for mounting the data driving IC 200*a* on the display panel is performed (S220).

After the module process is performed, it is tested whether the crack detecting lines CD1 through CD4 have defects through the data driving IC 200*a* (S230). The data driving IC 200*a* may test the defects of the crack detecting lines CD1 through CD4 by applying a test voltage to the pads 140*a*, 140*e*, 140*c*, and 140*g*.

In S230, when the bright line is expressed by the pixels connected to the data lines D2 and D4, D3, Dm-2, or Dm-1 for receiving a test voltage from the crack detecting lines CD1 through CD4, the resistance of the crack detecting lines CD1 through CD4 is tested through the data driving IC 200*a* (S240).

In S230, when the bright line is seen, the data driving IC 200*a* may measure the resistance of the crack detecting line CD1 using the line L1 and the line L2 connected to the crack detecting line CD1, and may measure the resistance of the crack detecting line CD2 using the line L3 and the line L4 connected to the crack detecting line CD2. The data driving IC 200*a* may measure the resistance of the crack detecting line CD3 using the line L5 and line L6 connected to the crack detecting line CD3, and may measure the resistance of the crack detecting line CD4 using the line L7 and line L8 connected to the crack detecting line CD2.

In S240, when the measured resistance is within a predetermined range, it is determined that no crack is generated in the crack detecting lines CD1 through CD4, and a defect is generated in the lines (e.g., a data line or a gate line) in the display panel (S242).

In S240, when the measured resistance exceeds the predetermined range, it is determined that a crack is generated in the crack detecting lines CD1 through CD4 (S244).

In S230, when the bright line is not visible, it is determined that no crack is generated in the crack detecting lines CD1 through CD4, and no defect is generated in the lines (e.g., a data line and a gate line) in the display panel (S250). That is, the display panel is again determined to be a good product.

As described above, according to the display device and the manufacturing method thereof according to exemplary embodiments, it may be efficiently detected whether a crack is generated in the display panel before and after the driving IC is mounted on the display panel. Further, according to the display device and the manufacturing method thereof according to exemplary embodiments, it can be accurately determined whether a crack is generated in the display panel or whether a defect is generated in the lines (e.g., a data line and a gate line) in the display panel. In addition, according to the display device and the manufacturing method thereof according to exemplary embodiments, the position of the crack in the display panel may be efficiently detected.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A display device, comprising:

a substrate comprising a display area and a non-display area disposed near the display area;

a plurality of pixels disposed in the display area;

a plurality of signal lines disposed on the substrate and connected to the pixels; and a pad portion disposed in the non-display area and comprising a plurality of pads, wherein the signal lines comprise:

a first crack detecting line disposed in the non-display area and directly electrically connected to a first test voltage pad and a first pad at a first node, directly electrically connected to a second pad at a second node, and extending directly across from at least a majority of one side of the display area between the first node and the second node; and a first data line comprising a first end connected to a first transistor connected to the first crack detecting line at the second node, and a second end connected to corresponding pixels from among the plurality of pixels.

2. The display device of claim 1, wherein the signal lines further comprise:

a plurality of second data lines, each comprising a first end connected to the first crack detecting line through a corresponding one of a plurality of second transistors and a second end connected to corresponding pixels from among the plurality of pixels.

3. The display device of claim 2, wherein the signal lines further comprise:

a control line connected to gates of the first transistor and the second transistors.

4. The display device of claim 3, wherein a crack of the first crack detecting line is detected by applying an enable-level voltage to the control line and applying a black gray voltage to the first test voltage pad.

5. The display device of claim 3, further comprising:

a first additional pad connected to the first pad; and a second additional pad connected to the second pad, wherein the first and second additional pads are disposed in the non-display area, wherein, while a disable-level voltage is applied to the control line, a resistance of the first crack detecting line is measured using the first additional pad and the second additional pad.

6. The display device of claim 5, further comprising:

a data driving integrated circuit (IC) connected to the pad portion, wherein the first test voltage pad, the first additional pad, and the second additional pad are in a floating state.

7. The display device of claim 2, wherein the signal lines further comprise:

a first test voltage line comprising a first end connected to the first test voltage pad at the first node and a second end connected to the second transistors, wherein the first test voltage line has a resistance corresponding to a line resistance of the first crack detecting line.

8. The display device of claim 7, wherein the resistance of the first test voltage line is proportional to a magnitude of the line resistance.

9. The display device of claim 1, wherein the non-display area comprises a bendable area, and the signal lines comprise:

a second crack detecting line connected to a second test voltage pad and a third pad at a third node, connected to a fourth pad at a fourth node, and extending around the bendable area between the third node and the fourth node; and a second data line comprising a first end connected to a second transistor connected to the second crack detecting line at the third node, and a second end connected to corresponding pixels from among the plurality of pixels.

10. The display device of claim 9, wherein the first crack detecting line and the second crack detecting line respectively comprise a line reciprocating in a zigzag pattern along at least one side of the display area.

11. A method for manufacturing a display device, comprising:

manufacturing a display panel;

testing for a crack in the display panel using a first set of pads before mounting a driving integrated circuit (IC) to the display panel;

mounting the driving IC to the display panel using a second set of pads spaced apart from the first set of pads in plan view; and testing for a crack in the display panel again, after mounting the driving IC to the display panel, using the driving IC and the second set of pads, wherein manufacturing the display panel comprises:

forming a plurality of pixels in a display area of a substrate, wherein the substrate comprises the display area and a non-display area disposed near the display area;

forming a plurality of signal lines on the substrate, wherein the signal lines are electrically connected to the pixels; and forming a pad portion in the non-display area, wherein the pad portion comprises a plurality of pads including the first set of pads and the second set of pads, wherein the signal lines comprise:

a first crack detecting line disposed in the non-display area to detect a crack in the display panel, the first crack detecting line directly electrically connected to a first test voltage pad and a first pad at a first node, directly electrically connected to a second pad at a second node, and extending directly across from at least a majority of one side of the display area between the first node and the second node;

a first data line comprising a first end electrically connected to a first transistor electrically connected to the first crack detecting line at the second node, and a second end electrically connected to corresponding pixels from among the plurality of pixels;

a plurality of second data lines, each comprising a first end electrically connected to the first crack detecting line through a corresponding one of a plurality of second transistors and a second end electrically connected to corresponding pixels from among the plurality of pixels; and a control line electrically connected to gates of the first transistor and the second transistors.

12. The method of claim 11, further comprising:

measuring a resistance of the first crack detecting line when testing for the crack in the display panel again using the driving IC indicates that a crack has been detected.

13. The method of claim 12, wherein measuring the resistance of the first crack detecting line comprises:

applying a disable-level voltage to the control line; and measuring the resistance of the first crack detecting line using a first additional pad and a second additional pad while applying the disable-level voltage to the control line, wherein the first additional pad is electrically connected to the first pad, and the second additional pad is electrically connected to the second pad, wherein the first and second additional pads are disposed in the non-display area.

14. The method of claim 13, wherein mounting the driving IC to the display panel comprises:

connecting a data driving IC to the pad portion, wherein testing for a crack in the display panel again using the driving IC is performed while the first test voltage pad, the first additional pad, and the second additional pad are in a floating state.

15. The method of claim 14, wherein measuring the resistance of the first crack detecting line comprises:

measuring, by the driving IC, the resistance of the first crack detecting line using the first pad and the second pad.

16. The method of claim 11, wherein testing for a crack in the display panel comprises:

applying an enable-level voltage to the control line; and applying a black gray voltage to the first test voltage pad.

17. The display device of claim 1, wherein the first crack detecting line extends directly across from at least two adjacent sides of the display area between the first node and the second node.

* * * * *